(12) United States Patent
Ohama et al.

(10) Patent No.: US 6,576,707 B2
(45) Date of Patent: Jun. 10, 2003

(54) MULTI-PIECE SOLID GOLF BALL

(75) Inventors: Keiji Ohama, Kobe (JP); Seiichiro Endo, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/012,534

(22) Filed: Dec. 12, 2001

(65) Prior Publication Data

US 2002/0173380 A1 Nov. 21, 2002

(30) Foreign Application Priority Data

Dec. 12, 2000 (JP) ........................................ 2000-377272
Sep. 27, 2001 (JP) ........................................ 2000-296682

(51) Int. Cl.$^7$ .............................................. C08L 53/00
(52) U.S. Cl. ......................... 525/93; 473/373; 473/374
(58) Field of Search ............................. 525/93; 473/373, 473/374

(56) References Cited

U.S. PATENT DOCUMENTS

| 5,504,156 A | * | 4/1996 | Takezaki |
| 5,872,185 A | | 2/1999 | Ichikawa et al. |
| 5,948,862 A | | 9/1999 | Sano et al. |
| 6,334,820 B1 | * | 1/2002 | Sasaki |
| 2001/0005698 A1 | * | 6/2001 | Kaltenbacher |
| 2002/0034991 A1 | * | 3/2002 | Sasaki |
| 2002/0155903 A1 | * | 10/2002 | Kato |

FOREIGN PATENT DOCUMENTS

| JP | A10-80505 | 3/1998 |
| JP | A10-174728 | 6/1998 |

* cited by examiner

Primary Examiner—David J. Buttner
(74) Attorney, Agent, or Firm—Birch, Stewart, Kolasch & Birch, LLP

(57) ABSTRACT

The present invention provides a multi-piece solid golf ball having very good shot feel, excellent durability and excellent flight performance. The present invention relates to a multi-piece solid golf ball comprising a core, an inner cover and outer cover, wherein the inner cover has a Shore D hardness of 30 to 62, and is formed from an inner cover composition comprising (a) 50 to 95 parts by weight of ethylene-(meth)acrylic acid copolymer ionomer resin, and (b) 5 to 50 parts by weight of thermoplastic elastomer formed from a polymer alloy of an olefin with a block copolymer having styrene block, based on 100 parts by weight of a base resin; the outer cover is formed from a composition comprising ionomer resin as a main component, and has a Shore D hardness of 58 to 68; and the hardness of the outer cover is higher than that of the inner cover.

4 Claims, 1 Drawing Sheet

F i g. 1
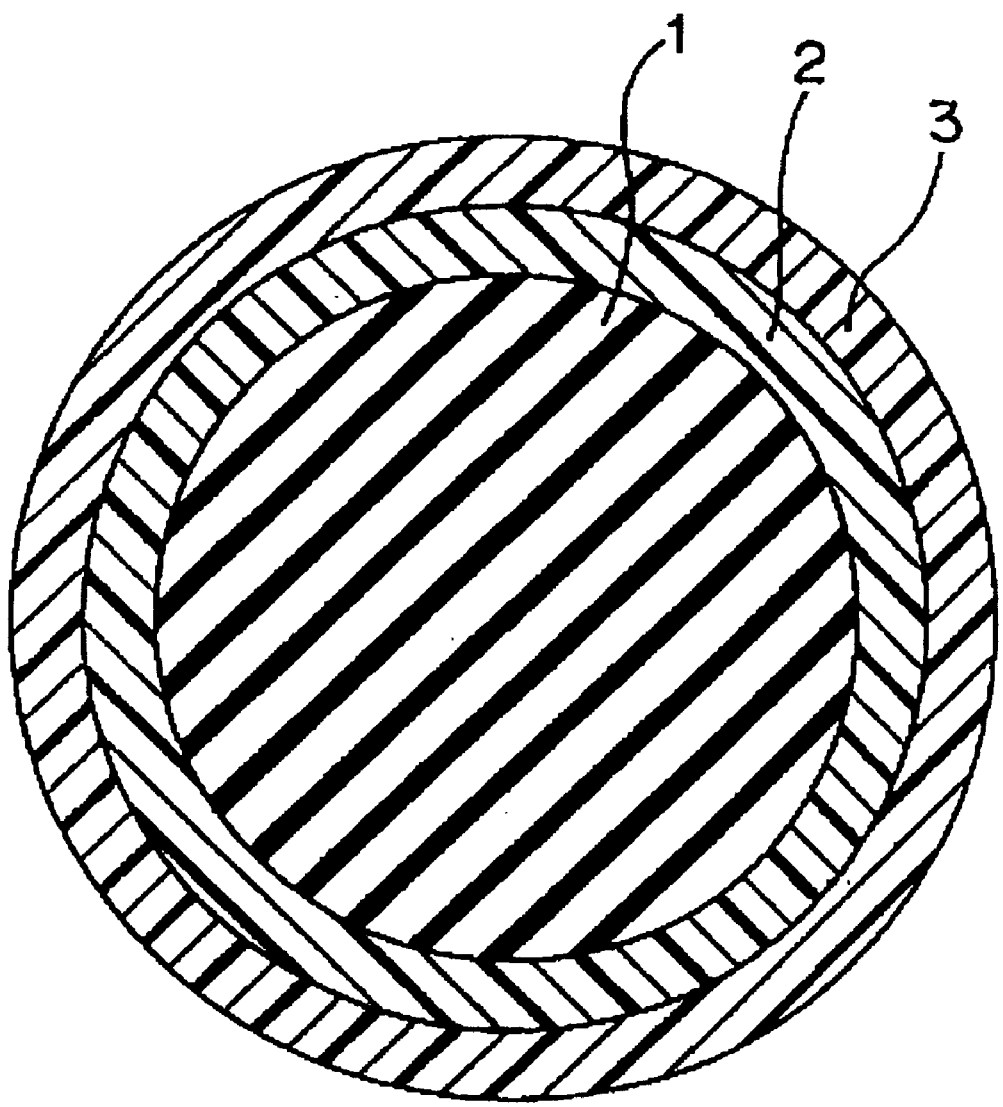

MULTI-PIECE SOLID GOLF BALL

FIELD OF THE INVENTION

The present invention relates to a multi-piece solid golf ball. More particularly, it relates to a multi-piece solid golf ball having very good shot feel, excellent durability and excellent flight performance.

BACKGROUND OF THE INVENTION

In golf balls commercially selling, there are solid golf balls such as two-piece golf ball, three-piece golf ball and the like, and thread wound golf balls. Recently, the two-piece golf ball and three-piece golf ball, of which flight distance can be improved while maintaining soft and good shot feel at the time of hitting as good as the conventional thread wound golf ball, generally occupy the greater part of the golf ball market. Multi-piece golf balls represented by the three-piece golf ball have good shot feel while maintaining excellent flight performance, because they can vary hardness distribution, when compared with the two-piece golf ball (Japanese Patent Kokai publication Nos. 80505/1998, 174728/1998 and the like).

In Japanese Patent Kokai publication No. 80505/1998, a golf ball comprising a core, an intermediate layer and a cover, of which the intermediate layer is formed from resin component comprising as a main component a mixture consisted of 10 to 60 parts by weight of thermoplastic elastomer comprising crystalline polyethylene block, and 90 to 40 parts by weight of ionomer resin having a melt index at 190° C. of 3 g/min, is described. As the thermoplastic elastomer, thermoplastic elastomer comprising polyethylene block, or polyethylene block and polystyrene block as a hard segment, and ethylene/butylene random copolymer as a soft segment, is described.

In Japanese Patent Kokai publication No. 174728/1998, a multi-piece solid golf ball comprising a core, at least one layer of an intermediate layer and a cover, of which at least one layer of the intermediate layer is formed from as a main component heated mixture of at least two components selected from three components consisting of ionomer resin, thermoplastic elastomer having a terminal OH group, and styrene-butadiene-styrene block copolymer or styrene-isoprene-styrene block copolymer having an epoxy group, and the intermediate layer has a hardness in JIS-C hardness of 40 to 80, and a hardness difference from the center to the surface of the core is not more than 15, is described.

However, in the both golf balls, there is much room for improvement of flight performance, because particularly sufficient rebound characteristics are not obtained. Therefore, it is required to provide a golf ball having better shot feel, better flight performance and better durability.

OBJECTS OF THE INVENTION

A main object of the present invention is to provide a multi-piece solid golf ball having very good shot feel, excellent durability and excellent flight performance.

According to the present invention, the object described above has been accomplished by providing a multi-piece solid golf ball comprising a core, an inner cover and an outer cover, employing a blend of ionomer resin and specified thermoplastic elastomer formed from a polymer alloy of an olefin with a block copolymer having styrene block in the inner cover, and adjusting the hardness of the inner cover and outer cover, and the hardness distribution between them to specified ranges, thereby providing a multi-piece solid golf ball having very good shot feel, excellent durability and excellent flight performance.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accompanying drawings which are given by way of illustration only, and thus are not limitative of the present invention, and wherein:

FIG. 1 is a schematic cross section illustrating one embodiment of the golf ball of the present invention.

SUMMARY OF THE INVENTION

The present invention provides a multi-piece solid golf ball comprising a core, an inner cover formed on the core and an outer cover covering the inner cover, wherein the inner cover has a Shore D hardness of 30 to 62, and is formed from an inner cover composition comprising
(a) 50 to 95 parts by weight of ethylene-(meth)acrylic acid copolymer ionomer resin, and
(b) 5 to 50 parts by weight of thermoplastic elastomer formed from a polymer alloy of an olefin with a block copolymer having styrene block, based on 100 parts by weight of a base resin, and the block copolymer having styrene block is selected from the group consisting of styrene-butadiene-styrene block copolymer (SBS), hydrogenation product of SBS, styrene-isoprene-styrene block copolymer (SIS), hydrogenation product of SIS, styrene-isoprene-butadiene-styrene block copolymer (SIBS), and hydrogenation product of SIBS, the outer cover is formed from an outer cover composition comprising ionomer resin as a main component, and has a Shore D hardness of 58 to 68, and the hardness of the outer cover is higher than that of the inner cover.

In order to put the present invention into a more suitable practical application, it is preferable that the thermoplastic elastomer have a Shore A hardness of not more than 95;

a ratio ($t_1/t_0$) of a thickness of the inner cover ($t_1$) to that of the outer cover ($t_0$) be within the range of 0.8 to 1.2;

the core have a deformation amount of 3.5 to 6.0 mm, when applying from an initial load of 98 N to a final load of 1275 N.

DETAILED DESCRIPTION OF THE INVENTION

The multi-piece solid golf ball of the present invention will be explained with reference to the accompanying drawing in detail. FIG. 1 is a schematic cross section illustrating one embodiment of the multi-piece solid golf ball of the present invention. As shown in FIG. 1, the golf ball of the present invention comprises a core 1, an inner cover 2 formed on the core 1, and an outer cover 3 covering the inner cover. The core is obtained by press-molding a rubber composition under applied heat by using a method and condition, which has been conventionally used for preparing solid cores of golf balls. The rubber composition contains a base rubber, a co-crosslinking agent, an organic peroxide, a filler and the like.

The base rubber used for the core of the present invention may be natural rubber and/or synthetic rubber, which has been conventionally used for cores of solid golf balls. Preferred is high-cis polybutadiene rubber containing a cis-1, 4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent can be a metal salt of α,β-unsaturated carboxylic acid, including mono or divalent metal salts, such as zinc or magnesium salts of α,β-unsaturated carboxylic acids having 3 to 8 carbon atoms (e.g. acrylic acid, methacrylic acid, etc.). The preferred co-crosslinking agent is zinc acrylate, because it imparts high rebound characteristics to the resulting golf ball. The amount of the co-crosslinking agent is from 10 to 45 parts by weight, preferably from 15 to 40 parts by weight, based on 100 parts by weight of the base rubber. When the amount of the co-crosslinking agent is smaller than 10 parts by weight, the core is too soft, and the rebound characteristics are degraded, which reduces the flight distance. In addition, since the cover is formed from soft materials, the resulting golf ball is too soft, and the shot feel is poor. On the other hand, when the amount of the co-crosslinking agent is larger than 45 parts by weight, the core is too hard, and the shot feel of the resulting golf ball is poor.

The organic peroxide, which acts as a crosslinking agent or curing agent, includes, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide is from 0.1 to 5 parts by weight, preferably 0.3 to 3 parts by weight, based on 100 parts by weight of the base rubber. When the amount of the organic peroxide is smaller than 0.1 parts by weight, the core is too soft, and the rebound characteristics of the resulting golf ball are degraded, which reduces the flight distance. On the other hand, when the amount of the organic peroxide is larger than 5 parts by weight, the core is too hard, and the shot feel of the resulting golf ball is poor.

The filler, which can be typically used for the core of solid golf ball, includes for example, inorganic filler (such as zinc oxide, barium sulfate, calcium carbonate, magnesium oxide and the like), high specific gravity metal powder filler (such as tungsten powder, molybdenum powder and the like), and the mixture thereof. The amount of the filler is from 3 to 40 parts by weight, preferably from 5 to 30 parts by weight, based on 100 parts by weight of the base rubber. When the amount of the filler is smaller than 3 parts by weight, it is required to add a large amount of filler to the cover in order to adjust the weight of the resulting golf ball to a proper range. Therefore the rebound characteristics of the resulting golf ball are degraded. On the other hand, when the amount of the filler is larger than 40 parts by weight, it is difficult to adjust the weight of the resulting golf ball to a proper range.

The rubber compositions for the core of the golf ball of the present invention can contain other components, which have been conventionally used for preparing the core of solid golf balls, such as organic sulfide compound, antioxidant and the like.

The core of the golf ball of the present invention can be obtained by uniformly mixing the rubber composition, and then press-molding and vulcanizing the mixture under applied heat in a mold. The vulcanizing, of which the condition is not limited, is conducted at 130 to 180° C. and 2.9 to 9.8 MPa for 15 to 60 minutes.

In the golf ball of the present invention, the core 1 has a diameter of 30 to 40 mm, preferably 32 to 39 mm. When the diameter of the core is smaller than 30 mm, it is required to increase the thickness of the inner cover and outer cover in order to adjust the diameter of the resulting golf ball to diameter conformed to the regulations for golf balls. Therefore, the technical effects accomplished by the presence of the core are not sufficiently obtained. On the other hand, when the diameter of the inner core is larger than 40 mm, it is required to decrease the thickness of the inner cover and outer cover, the technical effects accomplished by the presence of the cover are not sufficiently obtained.

In the golf ball of the present invention, it is required for the core 1 to have a deformation amount when applying from an initial load of 98 N to a final load of 1275 N of 3.5 to 6.0 mm, preferably 4.0 to 6.0 mm, more preferably 4.0 to 5.5 mm, most preferably 4.5 to 5.5 mm. When the deformation amount of the core is smaller than 3.5 mm, the core is too hard, and it is difficult to deform the core at the time of hitting, which degrades the shot feel of the resulting golf ball. On the other hand, when the deformation amount is larger than 6.0 mm, the core is too soft, and the core excessively deforms at the time of hitting, which degrades the durability.

The inner cover 2 is then covered on the core. In the golf ball of the present invention, it is desired for the inner cover to have a thickness of 0.5 to 2.5 mm, preferably 1.0 to 2.0 mm. When the thickness of the cover is smaller than 0.5 mm, the technical effects accomplished by the presence of the inner cover are not sufficiently obtained, and the flight performance and controllability are degraded. On the other hand, when the thickness is larger than 2.5 mm, the technical effects accomplished by the presence of the core are not sufficiently obtained, and the flight performance and shot feel are degraded.

In the golf ball of the present invention, it is required for the inner cover to have a Shore D hardness of 30 to 62, preferably 36 to 62, more preferably 40 to 62, most preferably 45 to 60, particularly preferably 50 to 60. When the hardness of the inner cover is lower than 30, the rebound characteristics necessary for the inner cover are not obtained, which reduces the flight distance. On the other hand, when the hardness of the inner cover is higher than 62, the hardness difference from the hardness of the outer cover is too small, and the shot feel is poor.

In the golf ball of the present invention, it is required for the inner cover 2 to be formed from an inner cover composition comprising (a) 50 to 95 parts by weight of ethylene-(meth)acrylic acid copolymer ionomer resin, and (b) 5 to 50 parts by weight of thermoplastic elastomer formed from a polymer alloy of an olefin with a block copolymer having styrene block, based on 100 parts by weight of a base resin, and it is required for the block copolymer having styrene block to be selected from the group consisting of styrene-butadiene-styrene block copolymer (SBS), hydrogenation product of SBS, styrene-isoprene-styrene block copolymer (SIS), hydrogenation product of SIS, styrene-isoprene-butadiene-styrene block copolymer (SIBS), and hydrogenation product of SIBS.

In the golf ball of the present invention, the (a) component of the inner cover composition is ethylene-acrylic acid copolymer ionomer resin and/or ethylene-methacrylic acid copolymer ionomer resin. As a composition ratio of the ethylene to acrylic acid or methacrylic acid in the ionomer resin, it is preferable for the ionomer resin to comprise 70 to 95% by weight of the ethylene and 5 to 30% by weight of the acrylic acid or methacrylic acid. The ionomer resin is partially neutralized with metal salt, and crosslinked with metal ion. That is, at least a portion of carboxylic acid groups in the copolymer of ethylene and acrylic acid or methacrylic acid is neutralized and crosslinked with metal ion. Examples of the metal ion include alkaline metal ion, such as sodium ion, potassium ion, lithium ion and the like; divalent metal ion, such as zinc ion, calcium ion, magnesium ion and the like; trivalent metal ion, such as aluminum ion, neodymium ion and the like; and the mixture thereof. Preferred are sodium ion, zinc ion, lithium ion and the like, in view of rebound characteristics, durability and the like.

The (a) component is preferably high stiffness type ionomer resin having a Shore D hardness of 55 to 70, preferably 57 to 68, and a flexural modulus of 200 to 500 MPa, preferably 250 to 450 MPa.

Examples of the ionomer resin will be shown by a trade name thereof. Examples of the ionomer resin, which is commercially available from Mitsui Du Pont Polychemicals Co., Ltd. include Hi-milan 1555 (Na), Hi-milan 1557 (Zn), Hi-milan 1605 (Na), Hi-milan 1706 (Zn), Hi-milan 1707 (Na), Hi-milan AM7318 (Na), Hi-milan AM7315 (Zn), Hi-milan AM7317 (Zn), Hi-milan AM7311 (Mg) and Hi-milan MK7320 (K) and the like.

Examples of the ionomer resin, which is commercially available from Du Pont Co., include Surlyn 8945 (Na), Surlyn 8940 (Na), Surlyn 9910 (Zn), Surlyn 9945 (Zn), Surlyn 7930 (Li) and Surlyn 7940 (Li) and the like. Examples of the ionomer resin, which is commercially available from Exxon Chemical Co., include Iotek 7010 (Zn), Iotek 8000 (Na), Iotek 7030 (Zn), Iotek 8030 (Na) and the like.

Incidentally, Na, Zn, K, Li and Mg, which are described in parentheses after the trade name of the above ionomer resin, indicate their neutralizing metal ion species. These ionomer resins may be used alone or in combination of two or more thereof, or a mixture of one or more of the ionomer resin obtained by neutralizing with monovalent metal ion and the ionomer resin obtained by neutralizing with divalent metal ion, as the base resin of the inner cover in the present invention.

In the golf ball of the present invention, it is required for the base resin of the inner cover 2 to compound at least one thermoplastic elastomer formed from a polymer alloy of an olefin with a block copolymer having styrene block as the (b) component with the ionomer resin as the (a) component. It is required for the block copolymer having styrene block to be selected from the group consisting of styrene-butadiene-styrene block copolymer (SBS), hydrogenation product of SBS, styrene-isoprene-styrene block copolymer (SIS), hydrogenation product of SIS, styrene-isoprene-butadiene-styrene block copolymer (SIBS), and hydrogenation product of SIBS.

The thermoplastic elastomer having styrene block includes block copolymers having styrene block and conjugated diene compound block. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof. Examples of the thermoplastic elastomer having styrene block as the (b) component include styrene-butadiene-styrene block copolymer (SBS); styrene-isoprene-styrene block copolymer (SIS); styrene-isoprene-butadiene-styrene block copolymer (SIBS); or hydrogenation product thereof. That is, the thermoplastic elastomer having styrene block as the (b) component may be the SBS or hydrogenation product thereof; the SIS or hydrogenation product thereof; or the SIBS or hydrogenation product thereof. As the hydrogenation product of the SBS, for example, styrene-ethylene-butylene-styrene block copolymer (SEBS) obtained by hydrogenating double bond of butadiene portion in SBS may be used. As the hydrogenation product of the SIS, for example, styrene-ethylene-propylene-styrene block copolymer (SEPS) obtained by hydrogenating double bond of isoprene portion in SIS may be used. As the hydrogenation product of the SIBS, for example, styrene-ethylene-ethylene-propylene-styrene block copolymer (SEEPS) obtained by hydrogenating double bond of butadiene portion or isoprene portion in SIBS may be used.

Examples of the block copolymers include styrene-butadiene-styrene block copolymer (SBS); styrene-ethylene-butylene-styrene block copolymer (SEBS), of which the double bond in the butadiene portion of the SBS is hydrogenated; styrene-isoprene-styrene block copolymer (SIS); styrene-ethylene-propylene-styrene block copolymer (SEPS), of which the double bond in the isoprene portion of the SIS is hydrogenated; styrene-isoprene-butadiene-styrene block copolymer (SIBS); styrene-ethylene-ethylene-propylene-styrene block copolymer (SEEPS); and modification thereof.

A styrene content in the SBS, SEBS, SIS and SEPS is within the range of 10 to 50% by weight, preferably 15 to 45% by weight, based on the weight of the copolymer. When the styrene content is smaller than 10% by weight, the thermoplastic elastomer is too soft, and the cut resistance is degraded. On the other hand, when the styrene content is larger than 50% by weight, the technical effect of softening the inner cover accomplished by compounding the thermoplastic elastomer with the ionomer resin as the (a) component is not sufficiently obtained. Therefore, the shot feel and controllability are degraded.

The inventors of the present invention discovered that the resulting golf ball has excellent physical properties of inner the cover and excellent golf ball performance, particularly high coefficient of restitution by employing polymer alloys of olefin; and styrene-butadiene-styrene block copolymer (SBS), the hydrogenation product of the SBS, styrene-isoprene-styrene block copolymer (SIS), the hydrogenation product of the SIS, styrene-isoprene-butadiene-styrene block copolymer (SIBS), or the hydrogenation product of the SIBS, in the thermoplastic elastomer having styrene block as the (b) component of the inner cover.

It is considered as one of the reasons that the olefin component, which comprises the polymer alloy, contributes to the compatibility of the inner cover composition. The particularly preferred polymer alloy is polymer alloy of hydrogenated SBS (SEBS) commercially available from Shell Chemical Co. as a base polymer and the other polymer, which is blended at the molecular level. The preferred other polymer is polyolefins formed by polymerizing olefins having 2 to 10 of carbon atoms.

The term "polymer alloy" as used herein refers to multi-component based polymer, which is obtained by mixing or chemically bonding two or more polymers, and macroscopically shows homogeneous phase because one polymer is properly dispersed in the other polymer. As the case may be, the polymer alloy microscopically shows uniform structure, or heterogeneous structure because one polymer phase is dispersed in the other polymer phase. Since the multi-component polymer in the above state has new physical properties in addition to average properties derived from component polymers, it has widely used for modifying resin, rubber and the like.

Examples thereof include the polymer alloy commercially available from Mitsubishi Chemical Co., Ltd. under the trade name of "Rabalon" (such as "Rabalon SJ4400N", "Rabalon SJ5400N", "Rabalon SJ6400N", "Rabalon SJ7400N", "Rabalon SJ8400N", "Rabalon SJ9400N", "Rabalon SR04" and the like). The polymer alloy includes either a blend of polyolefin and block copolymer having styrene block, such as SBS and the like described above, and polymer containing the block copolymer and polyolefin as components. A weight ratio of the block copolymer to the olefin is within the range of 95:5 to 5:95, preferably 90:10 to 10:90. Examples of olefins include α-polyolefin having 2 to 8 carbon atoms and the like. The particularly preferred olefin is polypropylene.

It is desired for the thermoplastic elastomer formed from a polymer alloy of an olefin with a block copolymer having styrene block as the (b) component to have a Shore A hardness of not more than 95, preferably not more than 80. When the hardness is larger than 95, it is difficult to soften the inner cover.

In the golf ball of the present invention, it is required for the inner cover composition to comprise 50 to 95 parts by weight of the (a) component and 5 to 50 parts by weight of the (b) component, based on 100 parts by weight of the base resin. The amount of the (a) component is preferably 55 to 95 parts by weight, more preferably 55 to 90 parts by weight. The amount of the (b) component is preferably 10 to 50 parts by weight, more preferably 10 to 45 parts by weight. The (a) and (b) components has good compatibility by blending them at the above composition ratio, and they can be blended at the molecular level to form so-called polymer alloy. Therefore excellent physical properties such as hardness, strength and impact resilience, which have not obtained by conventional blend system, can be obtained. In the result, it is possible to soften the inner cover, while maintaining excellent stiffness and impact resilience from the (a) component. Therefore, the shot feel, spin performance (controllability) and durability of the resulting golf ball can be improved.

In the golf ball of the present invention, the inner cover composition may optionally contain other thermoplastic elastomer in addition to the base resin. The amount of the other thermoplastic elastomer is not more than 10 parts by weight, preferably not more than 8 parts by weight, based on the 100 parts by weight of the base resin. When the amount is larger than 10 parts by weight, the compatibility of each material in the inner cover composition is degraded, and the durability is poor.

Examples of the other thermoplastic elastomers include polyolefin-based thermoplastic elastomer, polyurethane-based thermoplastic elastomer, polyester-based thermoplastic elastomer, polyamide-based thermoplastic elastomer, and mixtures thereof.

Concrete examples of the other thermoplastic elastomers include polyolefin-based thermoplastic elastomer, which is commercially available from Mitsui Chemical Co., Ltd. under the trade name of "Milastomer" (such as "Milastomer M4800NW"); polyolefin-based thermoplastic elastomer, which is commercially available from Sumitomo Chemical Co., Ltd. under the trade name of "Sumitomo TPE" (such as "Sumitomo TPE3682" and "Sumitomo TPE9455"); polyurethane thermoplastic elastomer, which is commercially available from Kuraray Co., Ltd. under the trade name of "Kuramilon" (such as "Kuramilon 9195" and "Kuramilon 9180"); polyurethane-based thermoplastic elastomer, which is commercially available from BASF Polyurethane Elastomers Ltd. under the trade name of "Elastollan" (such as "Elastollan ET880" and "Elastollan ET890"); polyester-based thermoplastic elastomer, which is commercially available from Toray-Du Pont Co., Ltd. under the trade name of "Hytrel" (such as "Hytrel 4047", "Hytrel 4767", "Hytrel 5557"); polyamide-based thermoplastic elastomer, which is commercially available from Toray Co., Ltd. under the trade name of "Pebax" (such as "Pebax 2533"); and the like.

The inner cover of the present invention may be formed by conventional methods, which have been known to the art and used for forming the cover of the golf balls. For example, there can be used a method comprising molding the inner cover composition into a semi-spherical half-shell in advance, covering the core with the two half-shells, followed by pressure molding at 130 to 170° C. for 1 to 5 minutes, or a method comprising injection molding the inner cover composition directly on the core to cover it.

The outer cover 3 is then covered on the inner cover 2. In the golf ball of the present invention, it is desired for the outer cover 3 to have a thickness of 0.5 to 2.5 mm, preferably 1.0 to 2.0 mm. When the thickness is smaller than 0.5 mm, the technical effects accomplished by the presence of the outer cover are not sufficiently obtained, and the flight performance and durability are degraded. On the other hand, when the thickness is larger than 2.5 mm, the technical effects accomplished by the presence of the inner cover are not sufficiently obtained, and the shot feel is poor.

In the golf ball of the present invention, it is desired for a ratio $(t_1/t_0)$ of a thickness of the inner cover $(t_1)$ to that of the outer cover $(t_0)$ to be within the range of 0.8 to 1.2, preferably 0.85 to 1.15, more preferably 0.9 to 1.1. When the ratio is smaller than 0.8, the inner cover is too thin, and the outer cover has large effect on the properties of the golf ball, which degraded the shot feel. On the other hand, when the ratio is larger than 1.2, the inner cover is too thick or the outer cover is too thin, and the inner cover has large effect on the properties of the golf ball. Therefore, the rebound characteristics of the resulting golf ball are degraded, which degrades the flight performance.

In the golf ball of the present invention, it is required for the outer cover 3 to have a Shore D hardness of 58 to 68, preferably 60 to 66, more preferably 60 to 64. When the hardness is lower than 58, the deformation amount at the surface portion of the resulting golf ball at the time of hitting is large even if the hardness of the core is adjusted, and the shot feel is heavy and poor such that the rebound characteristics are poor. On the other hand, when the hardness is higher than 64, the surface portion of the resulting golf ball is too hard, and the shot feel of the resulting golf ball is hard and poor. In addition, the hardness difference from the outer cover is too large, and the deformation amount in the golf ball is uneven, which degraded the durability.

In the golf ball of the present invention, it is required that the hardness of the outer cover 3 be higher than that of the inner cover 2, and the hardness difference in Shore D hardness is preferably 3, more preferably 5. When the hardness of the outer cover 3 is not more than that of the inner cover 2, the rebound characteristics are degraded, and the flight performance is degraded. The term "hardness of the inner cover 2" and "hardness outer cover 3" refer to the hardness, which is measured by using a sample of heat and press molded sheet prepared from the inner cover composition and outer cover composition, respectively.

In the golf ball of the present invention, it is required for the outer cover composition to comprise ionomer resin as a main component, and the amount of the ionomer resin is preferably 70 to 100 parts by weight, based on 100 parts by weight of the outer cover composition. As the ionomer resin, ethylene-(meth)acrylic acid copolymer ionomer resin, which is the same as used for the (a) component of the inner cover composition, can be used. These ionomer resins may be used alone or in combination.

As the materials suitably used for the outer cover 3 of the present invention, the above ionomer resin may be used alone, but the ionomer resin may be used in combination with at least one of thermoplastic elastomer and the like. Examples of the thermoplastic elastomers include polyolefin-based thermoplastic elastomer, polyurethane-based thermoplastic elastomer, polyester-based thermoplastic elastomer, polyamide-based thermoplastic elastomer and the like, which is the same as the other thermoplastic elastomer used for the inner cover composition. The block copolymer having styrene block described above may be also used for the outer cover. Examples of thereof include block copolymers having styrene block, which are commercially available from Daicel Chemical Industries, Ltd. under the trade name of "Epofriend" (such as "Epofriend A1010") and block copolymers having styrene block, which are commercially available from Kuraray Co. Ltd. under the trade name of "Septon" (such as "Septon HG-252"). The amount of the thermoplastic elastomer and the like is not more than 30 parts by weight, preferably 0 to 20 parts by weight, based on the 100 parts by weight of the base resin for the outer cover. When the amount is larger than 30 parts by weight, the cover is too soft, and the rebound characteristics are degraded. In addition, the compatibility with the ionomer resin is degraded, and the durability is poor.

In the golf ball of the present invention, the outer cover composition may optionally contain pigments (such as titanium dioxide, etc.), and other additives (such as a dispersant, an antioxidant, a UV absorber, a photostabilizer and a fluorescent agent or a fluorescent brightener, etc.), in addition to the resin component.

The outer cover 3 of the present invention may be formed by conventional methods, which have been known to the art and used for forming the cover of the golf balls. For example, there can be used a method comprising molding the outer cover composition into a semi-spherical half-shell in advance, covering the inner cover coated core with the two half-shells, followed by pressure molding at 130 to 170° C. for 1 to 5 minutes, or a method comprising injection molding the outer cover composition directly on the inner cover coated core to cover it. At the time of molding the outer cover, many depressions called "dimples" are formed on the surface of the golf ball. Furthermore, paint finishing or marking with a stamp may be optionally provided after the outer cover is molded.

EXAMPLES

The following Examples and Comparative Examples further illustrate the present invention in detail but are not to be construed to limit the scope of the present invention.

Production of Core

The rubber compositions for the core having the formulations shown in Table 1 were mixed with a mixing roll, and then vulcanized by press-molding at 155° C. for 25 minutes in the mold composed of an upper mold and a lower mold having a semi-spherical cavity to obtain spherical cores having a diameter of 35.6 mm. The deformation amount of the resulting core was measured. The results are shown in Table 4 (Examples) and Table 5 (Comparative Examples). The test methods are described later. The amount of barium sulfate was adjusted to a proper amount such that the weight of the resulting golf ball was 45.4 g.

TABLE 1

| | (parts by weight) | | |
|---|---|---|---|
| Core composition | i | ii | iii |
| BR11 *1 | 100 | 100 | 100 |
| Zinc acrylate | 24 | 27 | 30 |
| Zinc oxide | 20 | 20 | 20 |
| Dicumyl peroxide | 0.8 | 0.8 | 0.8 |
| Diphenyl disulfide | 0.5 | 0.5 | 0.5 |
| Barium sulfate | proper amount | proper amount | proper amount |

*1: High-cis Polybutadiene rubber (trade name "BR11") available from JSR Co., Ltd. (Content of 1,4-cis-polybutadiene: 96%)

Preparation of Compositions for Inner Cover and Outer Cover

The formulation materials for the inner cover showed in Table 2 and formulation materials for the outer cover showed in Table 3 were respectively mixed using a kneading type twin-screw extruder to obtain pelletized cover compositions. The extrusion condition was, a screw diameter of 45 mm, a screw speed of 200 rpm, and a screw L/D of 35.

The formulation materials were heated at 150 to 220° C. at the die position of the extruder. The inner cover hardness and the outer cover hardness were determined by measuring a Shore D hardness, using a sample of a stack of the three or more heat and press molded sheets having a thickness of about 2 mm from the composition for each cover. The results are shown in the same Tables, respectively. The test methods are described later.

TABLE 2

| | | (parts by weight) | | | | | | |
|---|---|---|---|---|---|---|---|---|
| Inner cover composition | | A | B | C | D | E | F | G |
| Hi-milan 1605 | *2 | 40 | 35 | 35 | 35 | 10 | 50 | 35 |
| Hi-milan 1706 | *3 | 40 | 35 | 30 | 35 | — | 50 | 20 |
| Hi-milan AM7316 | *4 | — | — | — | 30 | — | — | — |
| Hytrel 4047 | *5 | — | — | 35 | — | — | — | — |
| Elastollan ET880 | *6 | — | — | — | — | 90 | — | — |
| Rabalon SR04 | *7 | 20 | 30 | — | — | — | — | — |
| Septon HG-252 | *9 | — | — | — | — | — | — | 45 |
| Inner cover hardness (Shore D) | | 56 | 51 | 56 | 57 | 35 | 63 | 51 |

TABLE 3

| | (parts by weight) | |
|---|---|---|
| Outer cover composition | X | Y |
| Hi-milan 1605 *2 | 50 | 25 |
| Hi-milan 1706 *3 | 50 | 25 |
| Hi-milan 1855 *8 | — | 50 |
| Titanium dioxide | 2 | 2 |
| Barium sulfate | 2 | 2 |

TABLE 3-continued

| | (parts by weight) | |
|---|---|---|
| Outer cover composition | X | Y |
| Outer cover hardness (Shore D) | 63 | 58 |

*2: Hi-milan 1605 (trade name), ethylene-methacrylic acid copolymer ionomer resin obtained by neutralizing with sodium ion, manufactured by Du Pont Mitsui Polychemicals Co., Ltd.
*3: Hi-milan 1706 (trade name), ethylene-methacrylic acid copolymer ionomer resin obtained by neutralizing with zinc ion, manufactured by Du Pont Mitsui Polychemicals Co., Ltd.
*4: Hi-milan AM7316 (trade name), ethylene-methacrylic acid-acrylic acid ester terpolymer ionomer resin obtained by neutralizing with zinc ion, manufactured by Du Pont Mitsui Polychemicals Co., Ltd.
*5: Hytrel 4047 (trade name), polyester-based thermoplastic elastomer, which is commercially available from Toray-Du Pont Co., Ltd.
*6: Elastollan ET880 (trade name), polyurethane-based thermoplastic elastomer, which is commercially available from BASF Polyurethane Elastomers Ltd.
*7: Rabalon SR04 (trade name), thermoplastic elastomer, which is polymer alloy of SEBS (styrene-ethylene-butylene-styrene block copolymer) and polypropylene, manufactured by Mitsubishi Chemical Co., Ltd.
*8: Hi-milan 1855 (trade name), ethylene-methacrylic acid-acrylic acid ester terpolymer ionomer resin obtained by neutralizing with zinc ion, manufactured by Du Pont Mitsui Polychemicals Co., Ltd.
*9: Septon HG-252 (trade name), SIBS (styrene-isoprene-butadiene-styrene) block copolymer having OH group, which is commercially available from Kuraray Co., Ltd.

Formation of Inner Cover

The resulting composition for the inner cover was injection-molded on the core to form an inner cover layer. The thickness ($t_i$) of the inner cover layer was measured. The results are shown in Table 4 (Examples) and Table 5 (Comparative Examples).

Examples 1 to 3 and Comparative Examples 1 to 5

The resulting composition for the outer cover was covered on the inner cover by injection molding to form an outer cover layer. The thickness ($t_o$) of the outer cover layer was measured. The ratio ($t_i/t_o$) was determined by calculating from the thickness of the inner cover ($t_1$) and that of the outer cover ($t_o$). The results are shown in Table 4 (Examples) and Table 5 (Comparative Examples). Then, paint was applied on the surface to obtain golf ball having a diameter of 42.8 mm and weight of 45.4 g. The coefficient of restitution, flight distance, durability and shot feel of the resulting golf balls were measured or evaluated. The results are shown in the same Tables. The test methods are as follows.

(Test Method)

(1) Deformation Amount

The deformation amount of core was determined by measuring a deformation amount when applying from an initial load of 98 N to a final load of 1275 N on the core.

(2) Inner Cover and Outer Cover Hardness

The hardness of the inner cover or outer cover was determined by measuring a hardness, using a sample of a stack of the three or more heat and press molded sheets having a thickness of about 2 mm from each cover composition, which had been stored at 23° C. for 2 weeks, with a Shore D hardness meter according to ASTM D-2240-68.

(3) Coefficient of Restitution

A cylindrical aluminum projectile having weight of 200 g was struck at a speed of 40 m/sec against a golf ball, and the velocity of the projectile and the golf ball before and after the strike were measured. The coefficient of restitution of the golf ball was calculated from the velocity and the weight of both the projectile and the golf ball. The measurement was conducted by using 12 golf balls for each sample (n=12), with the mean value being taken as the coefficient of restitution of each ball and expressed as an index, with the value of the index in Comparative Example 1 being taken as 1. A higher index corresponded to a higher rebound characteristic, and thus a good result.

(4) Flight Distance

A No. 1 wood club (W#1, a driver) having metal head was mounted to a swing robot manufactured by True Temper Co. and the resulting golf ball was hit at a head speed of 40 m/sec, the flight distance was measured. As the flight distance, carry that is a distance to the dropping point of the hit golf ball was measured. The measurement was conducted by using 12 golf balls for every sample (n=12), and the average is shown as the result of the golf ball.

(5) Durability

A No. 1 wood club (W#1, a driver) having metal head was mounted to a swing robot manufactured by True Temper Co. and the resulting golf ball was hit at a head speed of 45 m/second to strike against an impact board, repeatedly. The durability is determined by measuring the number of hit until the cover of the golf ball cracks, and is expressed as an index, with the value of the index in Comparative Example 1 being taken as 100. The larger the value is, the better durability the golf ball has.

(6) Shot Feel

The shot feel of the resulting golf ball was evaluated by 10 golfers according to practical hitting test using a No. 1 wood club (W#1, a driver). The evaluation criteria are as follows.

(Evaluation Criteria)

oo: Not less than 8 golfers out of 10 golfers felt that the golf ball has good shot feel such that the impact force at the time of hitting is low and the rebound characteristics is good.

o: Six to 7 golfers out of 10 golfers felt that the golf ball has good shot feel such that the impact force at the time of hitting is low and the rebound characteristics is good.

Δ: Four to 5 golfers out of 10 golfers felt that the golf ball has good shot feel such that the impact force at the time of hitting is low and the rebound characteristics is good.

x: Not more than 3 golfers out of 10 golfers felt that the golf ball has good shot feel such that the impact force at the time of hitting is low and the rebound characteristics is good.

(Test Results)

TABLE 4

| Example No. | 1 | 2 | 3 |
|---|---|---|---|
| (Core) | | | |
| Composition | i | ii | i |
| Deformation amount (mm) | 4.9 | 4.5 | 4.9 |
| (Inner cover) | | | |
| Composition | A | B | B |
| Hardness (Shore D) | 56 | 51 | 51 |
| Thickness $t_i$(mm) | 1.8 | 1.8 | 1.8 |
| (Outer cover composition) | | | |
| Composition | X | X | X |
| Hardness (Shore D) | 63 | 63 | 63 |
| Thickness $t_o$(mm) | 1.8 | 1.8 | 1.8 |
| Ratio ($t_i/t_o$) | 1 | 1 | 1 |

TABLE 4-continued

| Example No. | 1 | 2 | 3 |
|---|---|---|---|
| (Golf ball) | | | |
| Coefficient of restitution | 1.02 | 1.02 | 1.01 |
| Flight distance (m) | 192.5 | 192.0 | 192.0 |
| Durability | 110 | 120 | 115 |
| Shot feel (Impact force) | oo | oo | oo |
| (Rebound) | oo | oo | oo |

TABLE 5

| Comparative Example No. | 1 | 2 | 3 | 4 | 5 |
|---|---|---|---|---|---|
| (Core) | | | | | |
| Composition | i | i | ii | iii | ii |
| Deformation amount (mm) | 4.9 | 4.9 | 4.5 | 4.0 | 4.5 |
| (Inner cover) | | | | | |
| Composition | C | D | E | F | G |
| Hardness (Shore D) | 56 | 57 | 35 | 63 | 51 |
| Thickness $t_i$ (mm) | 1.8 | 1.8 | 2.0 | 1.8 | 1.8 |
| (Outer cover composition) | | | | | |
| Composition | X | X | X | Y | X |
| Hardness (Shore D) | 63 | 63 | 63 | 58 | 63 |
| Thickness $t_o$ (mm) | 1.8 | 1.8 | 1.6 | 1.8 | 1.8 |
| Ratio ($t_i/t_o$) | 1 | 1 | 1.25 | 1 | 1 |
| (Golf ball) | | | | | |
| Coefficient of restitution | 1.0 | 0.99 | 0.98 | 1.02 | 1.01 |
| Flight distance (m) | 191.5 | 191.0 | 190.5 | 192.0 | 191.0 |
| Durability | 100 | 105 | 110 | 115 | 110 |
| Shot feel (Impact force) | oo | o | o | x | oo |
| (Rebound) | Δ | Δ | x | x | Δ |

As is apparent from Tables 4 and 5, the golf balls of Examples 1 to 3 of the present invention, when compared with the golf balls of Comparative Examples 1 to 5, had very good shot feel, long flight distance when hit by a driver, and excellent controllability.

On the other hand, in the golf ball of Comparative Example 1, since the inner cover contains no (b) component and contains a large amount of the other thermoplastic elastomer, the durability is very poor and the shot feel is poor.

In the golf ball of Comparative Example 2, since the inner cover contains no (b) component and contains soft terpolymer ionomer resin, the coefficient of restitution is too small, and the flight distance is very short.

In the golf ball of Comparative Example 3, since the inner cover contains no (b) component and contains a small amount of the (a) component and a large amount of the other thermoplastic elastomer, the inner cover hardness is low and the coefficient of restitution is too small, which reduces the flight distance too much. In addition, the shot feel is poor such that the rebound characteristics are poor.

In the golf ball of Comparative Example 4, since the inner cover contains only the (a) component and no (b) component, the coefficient of restitution is large, the flight distance is long and the durability is excellent. However, the inner cover hardness is high, and the shot feel is very poor.

What is claimed is:

1. A multi-piece solid golf ball comprising a core, an inner cover formed on the core and an outer cover covering the inner cover, wherein the inner cover has a Shore D hardness of 30 to 62, and is formed from an inner cover composition comprising
(a) 50 to 95 parts by weight of ethylene-(meth)acrylic acid copolymer ionomer resin, and
(b) 5 to 50 parts by weight of thermoplastic elastomer formed from a polymer alloy of an polyolefin with a block copolymer having styrene block, based on 100 parts by weight of a base resin, and the block copolymer having styrene block is selected from the group consisting of styrene-butadiene-styrene block copolymer (SBS), hydrogenation product of SBS, styrene-isoprene-styrene block copolymer (SIS), hydrogenation product of SIS, styrene-isoprene-butadiene-styrene block copolymer (SIBS), and hydrogenation product of SIBS, the outer cover is formed from an outer cover composition comprising ionomer resin as a main component, and has a Shore D hardness of 58 to 68, and the hardness of the outer cover is higher than that of the inner cover.

2. The multi-piece solid golf ball according to claim 1, wherein the thermoplastic elastomer has a Shore A hardness of not more than 95.

3. The multi-piece solid golf ball according to claim 1, wherein a ratio ($t_1/t_o$) of a thickness of the inner cover ($t_1$) to that of the outer cover ($t_o$) is within the range of 0.8 to 1.2.

4. The multi-piece solid golf ball according to claim 1, wherein the core has a deformation amount of 3.5 to 6.0 mm, when applying from an initial load of 98 N to a final load of 1275 N.

* * * * *